Patented Feb. 10, 1953

2,628,247

UNITED STATES PATENT OFFICE 2,628,247

ESTERS OF DI-ARYL SUBSTITUTED ACETIC ACIDS

Moses Wolf Goldberg, Upper Montclair, and Sidney Teitel, East Paterson, N. J., assignors to Hoffmann-La Roche Inc., Nutley, N. J., a corporation of New Jersey No Drawing. Application April 2, 1951, Serial No. 218,894

6 Claims. (Cl. 260—469)

This invention relates to 1-aryl-dialkylaminoalkanol esters of di-aromatically substituted acetic acids, the acid addition, and the quaternary ammonium salts thereof. More particularly the invention relates to 1-aryl-dialkylaminoalkanol esters of diphenylacetic acid, benzilic acid and fluorene-9-carboxylic acid. The compounds in the form of their free bases can be represented by the following formula:

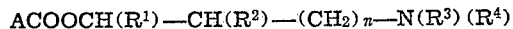

wherein A represents a member of the group consisting of diphenylmethyl, diphenylhydroxymethyl and fluorenyl; $R^1$ stands for phenyl and substituted phenyl, e. g., hydroxy substituted phenyl, lower alkoxy substituted phenyl and lower acyloxy substituted phenyl; $R^2$ represents hydrogen or lower alkyl; $R^3$ stands for lower alkyl; $R^4$ stands for a lower alkyl or a lower dialkylaminoalkyl group; and $n$ equals 0 or 1. The compounds are of interest in the field of pharmaceuticals, more particularly they are spasmolytics.

The new compounds can be prepared by various methods, for example, by reacting a di-aromatically substituted acetic acid halide, such as diphenylacetyl chloride, diphenylchloroacetyl chloride or fluorene-9-carboxylic acid chloride with a 1-aryl-dialkylaminoalkanol which can be represented by the following formula:

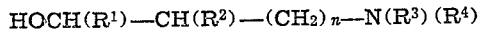

wherein $R^1$, $R^2$, $R^3$, $R^4$ and $n$ have the same meaning as herein above. When diphenylchloroacetyl chloride is employed in the reaction, the resulting α-chlorodiphenyl acetate is converted into the corresponding benzilic acid ester by selective hydrolysis of the chlorine atom. The esterification reaction is preferably carried out in the presence of an acid acceptor, for example, pyridine, in which case substantially equimolecular amounts of the reagents are employed in the reaction. The 1-aryl-dialkylaminoalkanol may also serve as the acid acceptor for the hydrohalic acid formed in the reaction, in which case it is employed in excess, for example, in the ratio of 2 moles of the 1-aryl-dialkylaminoalkanol to 1 mole of the di-aromatically substituted acetic acid halide. Any suitable solvent may be employed as a diluent, for example, ether, benzene, and the like. The 1-aryl-dialkylaminoalkanol esters of di-aromatically substituted acetic acids can readily be converted into the corresponding quaternary salts by reacting the esters in the form of their free bases with a quaternizing agent, such as an alkyl halide, aralkyl halide, dialkyl sulfate, alkyl p-toluenesulfonate, and the like. By treating the free bases with an acid, the acid addition salts can be obtained.

The 1-aryl-dialkylaminoalkanols can be prepared by heretofore known methods. Thus the N-alkylephedrine type can be obtained by the N-alkylation of ephedrine. Other 1-aryl-dialkylaminoalkanols can be prepared by reacting a secondary amine with a phenacyl halide followed by catalytic reduction of the salt of the amino-ketone thus formed to the corresponding alcohol. The preparation of various 1-aryl-dialkylaminoalkanols employed as intermediates is illustrated by the following examples.

EXAMPLE A 14 grams of ω-dimethylamino-p-methoxyacetophenone hydroiodide were dissolved in 200 cc. of water and freshly precipitated silver chloride (prepared from 18 grams of silver nitrate) was added. The mixture was shaken for ½ hour, filtered, the filtrate concentrated in vacuo to dryness and the yellow gum which formed crystallized from ethanol-ether to give the hydrochloride of ω-dimethylamino-p-methoxyacetophenone, M. P. 189–192° C. The latter compound was dissolved in 80 cc. of water, and was reduced with hydrogen at atmospheric pressure and room temperature in the presence of a palladium-charcoal catalyst. After removal of the catalyst by filtration, the colorless filtrate was taken to dryness in vacuo and the resulting viscous oil crystallized from ethanol-ether to yield the hydrochloride of 1-(4-methoxyphenyl)-2-dimethylaminoethanol, M. P. 144–145° C.

EXAMPLE B

To a stirred solution of 19 grams of dimethylamine in 100 cc. of benzene maintained at 10° C. was added over a 2 hour period a solution of 48.6 grams of p-methoxy-α-bromopropiophenone dissolved in 200 cc. of benzene. Crystals formed soon after addition had begun. The mixture was allowed to warm to room temperature, stirred for 5 hours, then washed with water. To the benzene layer were added 26 cc. of 48 per cent hydrobromic acid, and the mixture was then extracted with water. The aqueous extract was taken to dryness in vacuo and the amorphous solid thus obtained was crystallized from ethanol giving the hydrobromide of p-methoxy-α-dimethylaminopropiophenone, M. P. 191–193° C. 29 grams of this compound, dissolved in 140 cc.

water, were hydrogenated at room temperature and atmospheric pressure in the presence of 2.7 grams of 10 per cent palladium-charcoal catalyst. The catalyst was filtered off, and the filtrate partially concentrated. The hydrobromide of 1-(p-methoxyphenyl)-2-dimethylamino-1-propanol crystallized out upon cooling, M. P. 173–174° C.

EXAMPLE C 8 grams of the hydrochloride of p-hydroxy-α-dimethylaminoacetophenone, 12 cc. of glacial acetic acid and 12 cc. of acetyl chloride were heated 4 hours at 85° C. The resulting straw-colored solution was concentrated in vacuo, leaving an oil which was crystallized from 60 cc. of acetone. Recrystallization from water-acetone gave the crystalline hydrochloride of p-acetoxy-α-dimethylaminoacetophenone, M. P. 189–191° C. 6.2 grams of this compound, dissolved in 50 cc. of water, were hydrogenated at room temperature and atmospheric pressure in the presence of 0.5 gram of a 10 per cent palladium-charcoal catalyst. The catalyst was filtered off, the colorless filtrate taken to dryness in vacuo, and the residue crystallized from water-acetone. Upon recrystallization from water-acetone, the hydrochloride of 1-(p-acetoxyphenyl)-2-dimethylaminoethanol thus obtained melted at 157–159° C.

EXAMPLE D

To 13 grams of ω-bromo-3,4-dimethoxyacetophenone, dissolved in 80 cc. of benzene, were added at 10° C. over a period of ½ hour a solution of 7.3 grams of freshly distilled N-isopropylmethylamine in 20 cc. of benzene. The solution was allowed to warm to room temperature, stirred for 3 hours and then washed with water. To the benzene layer were added 9 grams of 48 per cent hydrobromic acid and then 50 cc. of water. The cherry-red colored aqueous phase was slightly decolorized by treatment with activated carbon, and then evaporated to dryness in vacuo, leaving a highly discolored crystalline residue. Recrystallization from 80 cc. of ethanol, followed by a second recrystallization, yielded the hydrobromide of α-isopropylmethylamino-3,4-dimethoxyacetophenone, M. P. 212–214° C.

8.8 grams of this compound dissolved in 80 cc. of water, were hydrogenated in the presence of 0.8 gram of a 10 per cent palladium-charcoal catalyst at 100° C. and 1000 lbs./sq. in. pressure. The catalyst was filtered off, the filtrate evaporated to a thick syrup, and then acetone added slowly to induce crystallization. Recrystallization from ethanol gave the hydrobromide of 1-(3,4-dimethoxyphenyl)-2-isopropylmethylaminoethanol, M. P. 152–154° C.

EXAMPLE E

To 116 grams of β-diethylaminoethylamine, while refluxing, were added 60 grams of styrene oxide over a 2-hour period. After an additional two hours of refluxing, the reaction product was distilled and the fraction boiling at 153–158° C. at 1.5 mm. was crystallized from petroleum ether to give 1-phenyl-2-(β-diethylaminoethylamino)-ethanol, M. P. 51–53° C. 62 grams of this compound were dissolved in 33 cc. of 90 per cent formic acid and 25 cc. of 35 per cent formaldehyde were added to the resulting solution. The solution was maintained at 70–75° C. for 2 hours and then refluxed for 2 hours. The reaction mixture was then taken to dryness in vacuo, and the residue made strongly alkaline with potassium hydroxide. The oil that separated was fractionated in vacuo, yielding 1-phenyl-2-(β-diethylaminoethylmethylamino)ethanol, B. P. 132° C. at 0.2 mm.

The following examples will serve to illustrate the preparation of the 1-aryl-dialkylaminoalkanol esters of di-aromatically substituted acetic acids.

Example 1

To a stirred solution of 13.2 grams of 1-phenyl-2-dimethylaminoethanol in 200 cc. of dry benzene were added over a one hour period 9.3 grams of diphenylacetyl chloride dissolved in 100 cc. of dry benzene. After refluxing for 3 hours, the crude crystalline hydrochloride of 1-phenyl-2-dimethylaminoethanol which had formed in the reaction was filtered off. The benzene filtrate was washed with water and then extracted with dilute hydrochloric acid. The aqueous solution was made alkaline with sodium carbonate, extracted with ether, the ether extract was washed with water and dried over anhydrous sodium sulfate. Dry hydrogen chloride was then bubbled in, precipitating the crystalline hydrochloride of the diphenylacetic acid ester of 1-phenyl-2-dimethylaminoethanol, M. P. 179–183° C. Recrystallization from acetonitrile raised the melting point to 183–185° C.

Example 2

10.8 grams of the hydrochloride of 1-phenyl-3-dimethylamino-1-propanol were dissolved in water, the solution made alkaline with sodium carbonate and extracted with ether. The ether exract was washed with water, dried over anhydrous sodium sulfate, the ether distilled off and the residual colorless oil dissolved in 100 cc. of dry benzene. The benzene solution of the free base was added over a one hour period to a stirred solution of 5.8 grams of diphenylacetyl chloride in 100 cc. of dry benzene. The mixture was refluxed for 3 hours, cooled and the crystals which had formed were filtered off. The benzene filtrate was washed with water and then with dilute hydrochloric acid. An oily layer formed between the lower aqueous phase and the upper benzene phase. It was separated and crystallized from acetonitrile-ether to yield the hydrochloride of the diphenylacetic acid ester of 1-phenyl-3-dimethylamino-1-propanol, M. P. 135–137° C.

Example 3

To 62.5 grams of 1-N-methylephedrine dissolved in 600 cc. of dry pyridine were slowly added with stirring over a period of ½ hour, 80.5 grams of diphenylacetyl chloride dissolved in 150 cc. of dry benzene. The internal temperature rose to 50° C. and fine needles began to precipitate. After refluxing for 3 hours the mixture was cooled, ether was added to the solid mass, and the crystals were filtered off. They were washed with ether, dried and recrystallized from aqueous acetone, to yield the hydrochloride of the diphenylacetic acid ester of 1-N-methylephedrine, M. P. 178–180° C.; $[\alpha]_D^{26} = -16.9°$ (c.=1, water).

The free base was prepared from the hydrochloride by adding an equivalent amount of sodium hydroxide to a stirred suspension of the hydrochloride in a mixture of water and ether. The ether extract, after washing with water and drying over sodium sulfate, was evaporated to dryness and the residual oil crystallized from hexane. The diphenylacetic acid ester of 1-N- methylephedrine thus obtained melted at 71–72° C.; $[\alpha]_D^{28} = -9.5°$ (c.=1.2, hexane).

The hydrobromide was prepared by bubbling dry hydrogen bromide into an ether solution of the free base. The precipitated hydrobromide was recrystallized from water-acetone, M. P. 211–213° C.

Example 4

A solution of 4.4 grams of the diphenylacetic acid ester of 1-N-methylephedrine and 4 cc. of ethyl bromide in 50 cc. of acetone was heated at 80° C. for 18 hours. The resulting solution was evaporated to dryness and the residual oil crystallized from acetone-ether. Upon recrystallization of the quaternary salt from acetone-ether, there was obtained dimethyl-($\beta$-diphenylacetoxy-$\alpha$-methylphenethyl)ethyl ammonium bromide, M. P. 160–162° C.

Example 5

11.5 grams of 1-N-ethylephedrine hydrochloride were dissolved in water. The solution was made alkaline with sodium hydroxide and extracted with ether. The ether extract was washed with water, dried over anhydrous sodium sulfate and the ether distilled off. The resulting oily 1-N-ethylephedrine was dried by dissolving in benzene and distilling off the solvent. It was then dissolved in 100 cc. of dry benzene and the resulting solution added slowly over a period of 1½ hours to a solution of 5.8 grams of diphenylacetyl chloride in 100 cc. of dry benzene. The turbid mixture was then refluxed for three hours, cooled, and the crystalline hydrochloride of 1-N-ethylephedrine filtered off. The straw-colored filtrate was extracted with dilute hydrochloric acid, the aqueous solution made alkaline with sodium carbonate and extracted with ether. The colorless ether extract, after washing with water and drying over anhydrous sodium sulfate, was taken to dryness. The resulting oil was crystallized from hexane to yield the diphenylacetic acid ester of 1-N-ethylephedrine, M. P. 53–55° C.

Example 6

7.3 grams of 1-N-isopropylephedrine were dissolved in water, the solution made alkaline with sodium carbonate and extracted with ether. After removal of the ether, the oily free base was freed of water by dissolving in benzene and distilling off the solvent. The dry base was dissolved in 50 cc. of dry pyridine and the solution added over ½ hour period to a solution of 6.9 grams of diphenylacetyl chloride in 20 cc. of dry benzene. The reaction mixture was stirred for 2 hours at room temperature, stored for about 16 hours and finally taken to dryness in vacuo. The resulting oil was distributed between 100 cc. of water and 100 cc. of ether, and the mixture adjusted to pH 8 with sodium carbonate. The ether layer was separated off and the aqueous phase twice re-extracted with 25 cc. portions of ether. The combined ether extracts were washed with water, dried over anhydrous sodium sulfate and taken to dryness to yield a colored oil. The latter crystallized from petroleum ether (B. P. 30–60° C.) to give crystalline diphenylacetic acid ester of 1-N-isopropylephedrine, which, upon recrystallization, melted at 67–69° C.; $[\alpha]_D^{28} = -10.2°$ (c.=1.3, hexane).

Example 7

To 6.6 grams of 1-N-diethylaminoethylephedrine, dissolved in 50 cc. of dry benzene and 50 cc. of dry pyridine, were added over a ½ hour period 6 grams of diphenylacetyl chloride in 30 cc. of benzene. The slightly yellow colored solution was stirred and then stored for about 16 hours. The solvents were removed in vacuo, the residual oil was partitioned between 100 cc. of cold ether and 100 cc. of water, and the pH adjusted to 8 with sodium carbonate. The ether layer was separated off, and the aqueous phase twice extracted with 25 cc. of ether. The combined ether extracts were washed with water, dried over anhydrous sodium sulfate and the filtrate taken to dryness. The oily residue thus obtained was dissolved in 150 cc. of acetone and 2.7 grams of 85 per cent phosphoric acid slowly added. The amorphous white precipitate thus obtained was crystallized from 100 cc. of 85 per cent acetone, to yield the diphosphate of diphenylacetic acid ester of 1-N-diethylaminoethylephedrine, M. P. 160–162° C.

Example 8

3.58 grams of 1-N-methylephedrine were refluxed while stirring with 0.46 gram of sodium in 50 cc. of toluene, until only a trace of sodium remained. This required about 6 hours. To the stirred suspension of the white gelatinous alcoholate were added, dropwise at 4° C., 5.08 grams of diphenylchloroacetyl chloride dissolved in 30 cc. of toluene. Stirring was continued at 4° C. for ½ hour, then at room temperature for 2 hours. A small amount of unreacted sodium was destroyed by adding 2 cc. of isopropanol. Then 60 cc. of 1 N hydrochloric acid was added, the mixture refluxed for ½ hour, cooled, and the toluene separated off. The lower of the two remaining layers was made alkaline with sodium carbonate and extracted with chloroform. The chloroform layer was water washed, dried over sodium sulfate and the solvent removed, thus yielding an oil. The latter was dissolved in ether, dry hydrogen chloride was passed in, to Congo red acidity, and the amorphous precipitate that formed was filtered off. Fractional crystallization from acetonitrile gave the 1-N-methylephedrine hydrochloride. The mother liquors were concentrated and the residue recrystallized from acetone, giving the hydrochloride of the benzilic acid ester of 1-N-methylephedrine, M. P. 164–166° C.

Example 9

To a stirred solution of 4.2 grams of fluorene-9-carboxylic acid chloride in 100 cc. of benzene was added over a one hour period a solution of 6.55 grams of 1-N-methylephedrine in 100 cc. of benzene. Crystals of 1-N-methylephedrine hydrochloride formed immediately, and after the mixture was refluxed for 3 hours they were filtered off. The filtrate was taken to dryness, yielding an oil. The latter was dissolved in ether and dry hydrogen chloride was bubbled in, to Congo red acidity. The hydrochloride of the fluorene-9-carboxylic acid ester of 1-N-methylephedrine precipitated out in amorphous form and was filtered off. Upon recrystallization from acetonitrile-ether, it melted at 173–174° C.

Example 10

Six grams of the hydrochloride of 1-(4-methoxyphenyl)-2-dimethylaminoethanol were dissolved in water, the solution made alkaline with sodium hydroxide and extracted with ether. After removal of the ether, the oily free base was freed of water by dissolving it in benzene and distilling off the solvent. It was then dissolved in 40 cc. of dry pyridine, and to the stirred solution were added, dropwise, 6 grams of diphenylacetyl chloride dissolved in 35 cc. of benzene. The solution, after storage at room temperature for about sixteen hours, was evaporated to dryness in vacuo. The resulting oil was distributed between ether and water, and the pH adjusted to 8 with sodium carbonate. The ether layer was separated and the aqueous phase re-extracted with fresh portions of ether. The combined ether extracts were washed with water, dried over anhydrous sodium sulfate and the ether evaporated. The resulting oil crystallized. Upon recrystallization from hexane there was obtained the diphenylacetic acid ester of 1-(4-methoxyphenyl)-2-dimethylaminoethanol, M. P. 85–87° C. The hydrochloride of the diphenylacetic acid ester of 1 - (4 - methoxyphenyl) - 2 - dimethylamino - ethanol was obtained by treating an ether solution of the free base with dry hydrogen chloride. After recrystallization from water-acetone the hydrochloride melted at 164–166° C.

Example 11

11.6 grams of the hydrobromide of 1-(p-methoxyphenyl) - 2 - dimethylamino - 1 - propanol were dissolved in water, the solution made strongly alkaline with sodium hydroxide and extracted with ether. The ether extract was washed with water, dried over anhydrous sodium sulfate and taken to dryness. The residual oil was dissolved in 100 cc. of benzene and added over a period of ½ hour to a stirred solution of 4.65 grams of diphenylacetyl chloride in 100 cc. of benzene. The mixture was refluxed for 3 hours and then cooled. The crystals which formed were filtered off, washed with benzene, and dried. They were found to be the hydrochloride of 1 - (p - methoxyphenyl) - 2 - dimethylamino - 1 - propanol. To the benzene filtrate, diluted with 100 cc. of ether, was added dilute hydrochloric acid to Congo red acidity. An oily layer was separated, and on scratching readily crystallized. The crystalline product was recrystallized from acetone-ether, whereupon the hydrochloride of the diphenylacetic acid ester of 1 - (p - methoxyphenyl) - 2 - dimethylamino - 1 - propanol was obtained, M. P. 157–159° C.

Example 12

4.15 grams of the hydrochloride of 1-(p-acetoxyphenyl)-2-dimethylaminoethanol were dissolved in ice water, the solution made alkaline with sodium carbonate and extracted with ether. The ether extract was washed with water, dried over anhydrous sodium sulfate and concentrated. The residual oil was freed of water by dissolving in benzene and distilling off the solvent. The oil was then dissolved in 75 cc. of dry pyridine, and to the stirred solution was added, dropwise, 3.72 grams of diphenylacetyl chloride dissolved in 50 cc. benzene. The solution, after storage for about 16 hours at room temperature, was dried in vacuo. The resulting oil was distributed between water and ether, and the pH was adjusted with sodium carbonate to 8. The ether layer was separated off and the aqueous phase re-extracted with fresh portions of ether. The combined ether extracts were washed with water and dried over anhydrous sodium sulfate. Dry hydrogen chloride was bubbled in, to Congo red acidity, and the gum that precipitated was crystallized from acetonitrile-ether. Upon recrystallization, there was obtained the hydrochloride of the diphenylacetic acid ester of 1-(p-acetoxyphenyl)-2-dimethylaminoethanol, M. P. 160–162° C.

Example 13

5.65 grams of the hydrobromide of 1-(3,4-dimethoxyphenyl) - 2 - isopropylmethylaminoethanol were dissolved in water, the solution made alkaline with sodium hydroxide and extracted with ether. The ether extract was washed with water, dried over sodium sulfate, and taken to dryness. The residual oil was dissolved in 30 cc. of dry pyridine, and to the stirred solution was added, dropwise, 3.9 grams of diphenylacetyl chloride dissolved in 18 cc. benzene. The solution, after storage for about 16 hours at room temperature, was evaporated to dryness in vacuo. The resulting oil was distributed between ether and water and the pH adjusted to 8 with sodium carbonate. The ether layer was separated off and the aqueous phase was re-extracted with fresh portions of ether. The combined ether extracts were washed with water, dried over sodium sulfate, and dry hydrogen chloride was bubbled in, to Congo red acidity. The precipitated amorphous product was crystallized from acetone-ether, yielding the hydrochloride of the diphenylacetic acid ester of 1-(3,4-dimethoxyphenyl) - 2 - isopropylmethylaminoethanol, M. P. 160–161° C.

Example 14

15 grams of 1-(3,4-dipropionoxyphenyl)-2-dimethylaminoethanol hydrochloride were dissolved in 80 cc. of water. To the stirred mixture was added 100 cc. of ether and then, slowly, at 4° C., 43.2 cc. of 1 N sodium hydroxide. The aqueous phase was separated and re-extracted with fresh ether. The combined ether extracts were washed with water, placed in a Dry-Ice acetone mixture for three hours, and the ice crystals which had formed were filtered off. The filtrate was then slowly added to a solution of 10 grams of diphenylacetyl chloride in 150 cc. of ether. The reaction mixture became turbid, then an oil formed, and after stirring for 3 hours the oil had completely crystallized. The crystals were filtered off and dried. Upon recrystallization from acetone-ether, there was obtained the hydrochloride of the diphenylacetic acid ester of 1-(3,4-dipropionoxyphenyl)-2-dimethylaminoethanol, M. P. 156–158° C.

Example 15

Eleven grams of the hydrochloride of the diphenylacetic acid ester of 1-(3,4-dipropionoxyphenyl)-2-dimethylaminoethanol were suspended in 100 cc. water and 350 cc. of ether, and to the stirred mixture was slowly added, at 4° C., 2.05 cc. of 1 N sodium hydroxide. When complete solution was obtained, the aqueous phase was re-extracted with two 25 cc. portions of ether. The combined ether extracts were washed with water, dried over sodium sulfate and concentrated. The residual oily base was dissolved in 50 cc. acetone, 2 cc. of ethyl bromide was added, and the solution was heated in a sealed tube at 80° C. for 18 hours. After cooling, the solvent was distilled off in vacuo and the residual oil crystallized from acetone-ether. The dimethyl - (β - diphenylacetoxy-3,4-dipropionoxyphenethyl) ethyl ammonium bromide thus obtained melted at 158–160° C.

Example 16

5.5 grams of hydrochloride of the diphenylacetic acid ester of 1-(3,4-dipropionoxyphenyl)-2-dimethylaminoethanol were converted to the free base in the same manner as described in the preceding example. The oily base was dissolved in 20 cc. acetone, 10 cc. of a 25 per cent solution of methyl bromide in acetone were added, and the solution heated in a sealed tube at 80° C. for 18 hours. After cooling, the solvent was distilled off in vacuo and the residual oil crystallized by trituration with acetone. Recrystallization from water - acetone yielded trimethyl($\beta$-diphenylacetoxy-3,4-dipropionoxyphenethyl) ammonium bromide, M. P. 155–157° C.

*Example 17*

To 4.8 grams of 1-phenyl-2-diethylaminoethanol dissolved in 80 cc. of pyridine were added 5.75 grams of diphenylacetyl chloride dissolved in 20 cc. of benzene. The solution, after refluxing for 3 hours, was taken to dryness in vacuo. The residual oil was dissolved in ether and the solution washed, first with dilute sodium carbonate, then with water. The ether extract was dried over sodium sulfate, dry hydrogen chloride gas bubbled in, to Congo red acidity, and the resulting precipitate filtered off. It was crystallized from acetone-ether, yielding the hydrochloride of the diphenylacetic acid ester of 1-phenyl-2-diethylaminoethanol, M. P. 106–108° C.

*Example 18*

To 4.1 grams of 1-phenyl-2-($\beta$-diethylaminoethyl-methylamino)ethanol dissolved in 65 cc. of pyridine were added 3.77 grams of diphenylacetyl chloride dissolved in 30 cc. of benzene. The solution, after refluxing for 3 hours, was taken to dryness in vacuo. The residual oil was dissolved in ether and the solution washed first with dilute sodium carbonate, then with water. The ether extract was dried over sodium sulfate and hydrogen chloride bubbled in, to Congo red acidity. The resulting precipitate was filtered off and crystallized from aqueous acetone, yielding the dihydrochloride of the diphenylacetic acid ester of 1-phenyl-2-($\beta$-diethylaminoethyl-methylamino)-ethanol, M. P. 195–197° C.

We claim:

1. A compound of the group consisting of 1-aryl-dialkylaminoalkanol esters of di-aryl substituted acetic acids having the following formula:

$$ACOOCH(R^1)-CH(R^2)-(CH_2)_n-N(R^3)(R^4)$$

wherein A is a member of the group consisting of diphenylmethyl, diphenylhydroxymethyl and 9-fluorenyl; $R^1$ is a member of the group consisting of phenyl, hydroxy substituted phenyl, lower alkoxy substituted phenyl and lower carboxylic acid acyloxy substituted phenyl; $R^2$ represents a member of the group consisting of hydrogen and lower alkyl; $R^3$ stands for lower alkyl; $R^4$ stands for a member of the group consisting of lower alkyl and lower dialkylaminoalkyl; $n$ stands for a member of the group consisting of 0 and 1, and the salts thereof.

2. The diphenylacetic acid ester of N-methylephedrine.

3. The hydrochloride of the diphenylacetic acid ester of N-methylephedrine.

4. The diphosphate of the diphenylacetic acid ester of N-diethylaminoethylephedrine.

5. The hydrochloride of the diphenylacetic acid ester of 1-phenyl-3-dimethylamino-1-propanol.

6. The hydrochloride of the diphenylacetic acid ester of 1-(4-methoxyphenyl)-2-dimethylaminoethanol.

MOSES WOLF GOLDBERG.
SIDNEY TEITEL.

No references cited.